United States Patent [19]
Miyashita et al.

[11] Patent Number: 5,737,200
[45] Date of Patent: Apr. 7, 1998

[54] SEMICONDUCTOR DEVICE PROTECTION METHOD

[75] Inventors: Shuji Miyashita; Ayumi Fujibayashi, both of Nagano, Japan

[73] Assignee: Fuji Electric Co., Ltd., Kawasaki, Japan

[21] Appl. No.: 779,156

[22] Filed: Jan. 3, 1997

[30] Foreign Application Priority Data

Jan. 10, 1996 [JP] Japan .................................. 8-001920

[51] Int. Cl.⁶ ...................................................... H02H 7/122
[52] U.S. Cl. .............................. 363/56; 363/17; 363/132; 363/98
[58] Field of Search ........................... 363/56, 58, 17, 363/132, 98; 361/220

[56] References Cited

U.S. PATENT DOCUMENTS

| | | | |
|---|---|---|---|
| 5,063,488 | 11/1991 | Harada et al. | 363/16 |
| 5,198,969 | 3/1993 | Redl et al. | 363/17 |
| 5,438,498 | 8/1995 | Ingemi | 363/17 |

FOREIGN PATENT DOCUMENTS 4-185286  7/1992  Japan .

OTHER PUBLICATIONS

Proceedings of 1990 International Symposium on Power Semiconductor Devices & ICs, Tokyo, pp. 144–149 "Super Mini Type Integrated Inverter Using Intelligent Power and Control Devices".

Abstracts (Fuji Electric Journal), vol. 63, No. 9, 1990, UDC 621.382.23.049.77:[621.382.23.026+621.382.33.026 ]:621.318.57 "Intelligent Power Modules Using IGBTs for Inverters".

*Primary Examiner*—Edward Tso
*Assistant Examiner*—Shawn Riley
*Attorney, Agent, or Firm*—Kanesaka & Takeuchi

[57] ABSTRACT

Semiconductor devices operating as switching elements for a power converter are protected in the invention. Each pair has upper and lower arms and is connected in series between electrodes of a DC power supply. In the converter, the pairs of the semiconductor devices are switched to convert power from the DC power supply to obtain converted power from a connection between the semiconductor devices in each pair. In the method, magnitudes of drive signals or drive-circuit constants for the semiconductor devices of the upper and lower arms in each pair are set to be different from each other, and a protection device is provided in only one of the semiconductor devices in the pair of the upper and lower arms. The protection device monitors voltage between main terminals of the semiconductor device where the protection device is installed, and controls the drive signal for the semiconductor device to prevent passage of an excessive current therethrough.

6 Claims, 4 Drawing Sheets

SEMICONDUCTOR DEVICE PROTECTION METHOD

BACKGROUND OF THE INVENTION AND RELATED ART STATEMENT

The present invention relates to a method for protecting semiconductor devices in a power-conversion apparatus having self-arc-extinguishing elements (hereinafter referred to as "self-arc-extinguishing semiconductor devices" or simply "semiconductor devices") such as power transistors or IGBTs constituting a bridge inverter circuit, wherein the semiconductor devices are protected, particularly during a short circuit, through the use of a simple protection circuit.

In the following drawings, the same reference numerals denote the same or equivalent components.

FIG. 4 shows an example of the structure of a conventional power converter including a short-circuit protection circuit for semiconductor devices. In this figure, 01 is a DC power supply; P and N are the positive and negative electrodes of the DC power supply 01; X1, Y1 and Z1 are IGBTs for the upper arms constituting a three-phase bridge inverter circuit; and X2, Y2 and Z2 are IGBTs for the lower arms. Each IGBT, i.e. X1 to Z1 and X2 to Z2, has a reflux diode connected oppositely in parallel. Each pair of the IGBTs in the upper and lower arms, i.e. X1 and X2, Y1 and Y2, and Z1 and Z2, is connected in series between the positive electrode P and negative electrode N of the DC power supply 01, and 3-phase AC current is obtained from the connections U, V and W, each being located between each pair of the IGBTs.

In addition, 2 is a drive circuit to drive the control terminal (in this case, the gate) of each IGBT, i.e. X1 to Z1 and X2 to Z2, and 1, which is provided in each IGBT, i.e. X1 to Z1 and X2 to Z2, is a short-circuit protection circuit in a saturated-voltage monitoring and control type.

When short-circuit occurs, the short-circuit protection circuit 1 attempts to protect the semiconductor device based on the phenomenon wherein the collector emitter voltage $V_{CE}$, i.e. the inter-main-terminal voltage of the semiconductor device (in this case, an IGBT) in which the short-circuit current is flowing, exceeds a predetermined threshold equal to or larger than a saturated voltage $V_{CE}$ (sat)=low, and becomes $V_{CE}$=high.

Specifically, in case of the gate drive input=high (present) and the $V_{CE}$=high, this condition is determined to be a short circuit and the gate-drive input signal (=a forward bias gate voltage=a gate emitter voltage) is reduced to restrain the short-circuit current.

In FIG. 4, the short-circuit protection circuit 1 is provided in all the semiconductor devices, i.e. X1 to Z1 and X2 to Z2, in each phase and each arm.

The short-circuit protection circuit 1 shown in FIG. 4 is provided primarily to protect the semiconductor devices in short-circuit between the output phases (for example, between the U and V phases) or between the arms (short circuit between a pair of semiconductor devices in the upper and lower arms). In this sense, short-circuit protection may be provided only for the semiconductor devices in either the upper or lower arm. During short circuit, however, the distribution of the voltage between the semiconductor devices in the upper and lower arms (thus, the voltage between the main terminals thereof) may vary, so it can not be determined which inter-main-terminal voltage in the upper or lower arm has exceeded the threshold to cause the short circuit. Thus, all the semiconductor devices in each phase and each arm require the short-circuit protection circuit shown in FIG. 4, resulting in the complex circuit.

An object of the invention is to obviate the above problem and to provide a short-circuit protection method by executing detection for only one of the upper and lower arms in order to simplify the protection circuit.

SUMMARY OF THE INVENTION

To solve the above problem, a power converter for a protection method according to a first aspect of the invention includes semiconductor devices as pairs of self-arc-extinguishing switching elements for forming upper and lower arms, respectively, the pair being connected in series between electrodes of a DC power supply (01), wherein the pairs of the semiconductor devices are switched via drive circuits 2 to convert power from the DC power supply and to obtain converted power from the connection (U, V and W) between the pairs of semiconductor devices. In the invention, magnitudes of the drive signals for the semiconductor devices or drive-circuit constants are formed to be different in the upper or lower arm, and only the semiconductor device in either the upper or lower arm includes protection means (a protection circuit 1) to monitor the voltage between the main terminal of the semiconductor device and to control the drive signals of the semiconductor device to thereby prevent the passage of excessive currents.

According to a protection method of a second aspect, in the protection method as set forth in the first aspect, the semiconductor devices are a current-driven type (bipolar transistors), and the forward-bias current ($+I_{B2}$) for the semiconductor device in the arm with the protection means (U2 to W2) is set at a smaller value than the forward-bias current ($+I_{B1}$) for the semiconductor device in the arm without the protection means (U1 to W1).

According to a protection method of a third aspect, in the protection method as set forth in the first aspect, the semiconductor devices are a voltage-driven type (IGBTs), and the forward-bias voltage ($+V_{GE2}$) for the semiconductor device in the arm with the protection means (X2 to Z2) is set at a smaller value than the forward-bias voltage ($+V_{GE1}$) for the semiconductor device in the arm without the protection means (X1 to Z1).

According to a protection method of a fourth aspect, in the protection method as set forth in the first aspect, the semiconductor devices are a voltage-driven type (IGBTs) including an excessive-current restriction circuit (3) using a current detection emitter (31), and the gate resistance ($R_{G2}$) for the semiconductor device in the arm with the protection means (X12 to Z12) is set at a greater value than the gate resistance ($R_{G1}$) for the semiconductor device in the arm without the protection means (X11 to Z11).

The effects of this invention are as follows. Namely, the phenomenon in which the inter-main-terminal voltage of a semiconductor device exceeds the saturated voltage at the time of short-circuit depends on the drive condition of the semiconductor device. Based on this characteristic, the drive conditions for the semiconductors in the upper and lower arms are made different, so that the short-circuit is detected by only one of the upper and lower arms for protection.

DETAILED DESCRIPTION OF THE PREFERRED EMBODIMENTS

Figure 1:
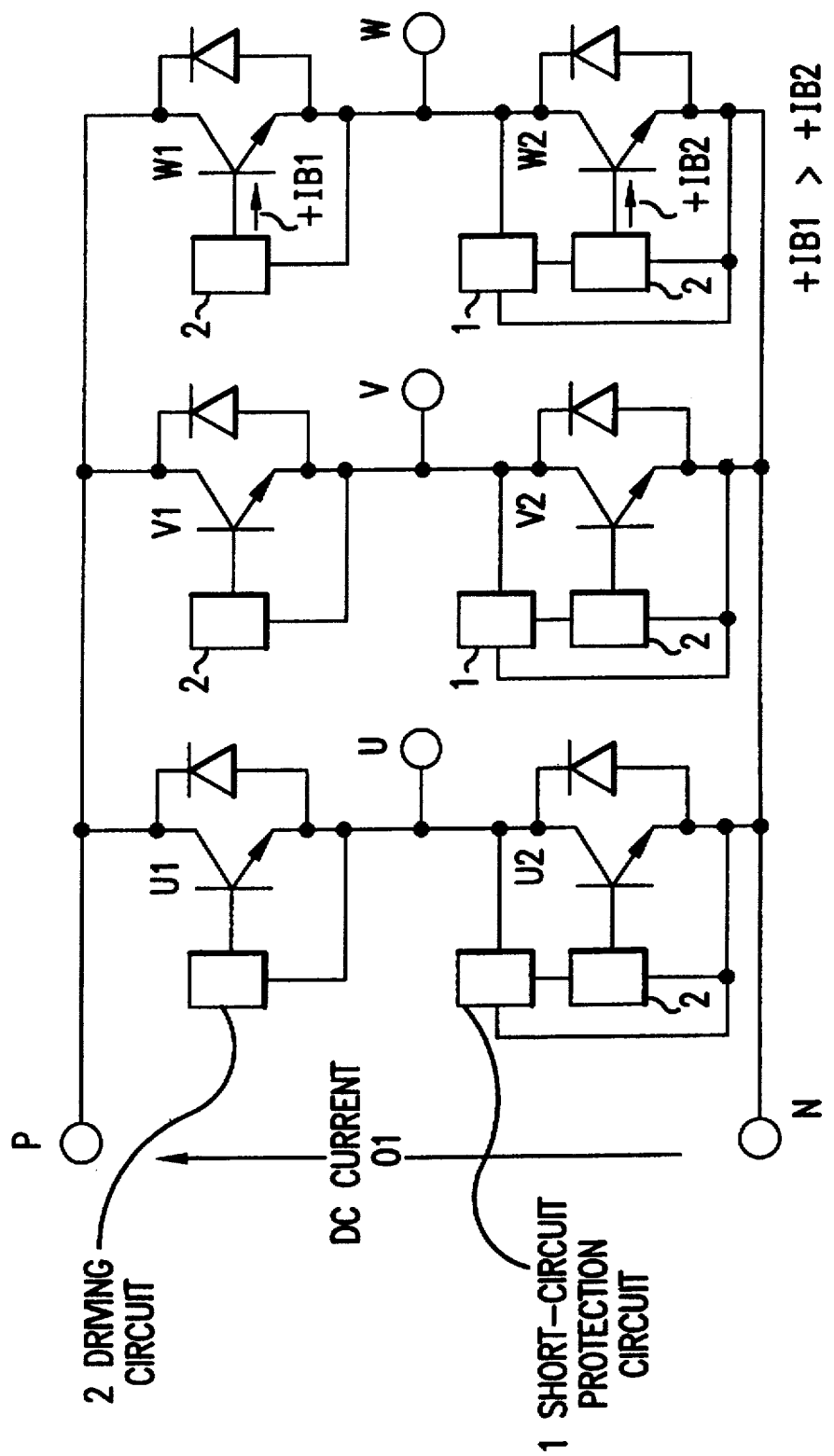
FIG. 1 is a circuit diagram showing a structure of a main part of a first embodiment of the invention.

FIG. 1 shows an example of a structure of a 3-phase bridge inverter circuit that uses bipolar transistors as current-driven self-arc-extinguishing semiconductor devices, to which the invention is applied. This figure corresponds to FIG. 4.

In FIG. 1, U1, V1 and W1 are bipolar transistors in the upper arms, and U2, V2 and W2 are bipolar transistors in the lower arms connected in series with the transistors U1, V1 and W1 in the upper arms, respectively. Reflux diodes are connected oppositely parallel to the respective bipolar transistors, U1 to W1 and U2 to W2.

In FIG. 1, a short-circuit protection circuit 1 is provided only in each of the lower arms of the transistors U2 to W2. In a drive circuit 2 to drive the control terminal (in this case, the base) of each of the transistors U1 to W2, the forward bias base current+$I_{B2}$ to drive the base of each of the bipolar transistors U2 to W2 in the lower arms is set at a smaller value than the forward bias base current +$I_{B1}$ to drive the base of each of the bipolar transistors U1 to W1 in the upper arms. That is, these currents are set as shown in the equation below.

$$+I_{B1} > I_{B2} \qquad \text{Equation 1}$$

If short circuit occurs between the U and V phases of the 3-phase outputs, for example, at the time of the transistors U1 and V2 are turned on, the short-circuit current flows from the DC power supply 01→the transistor U1→between the U and V phases of the 3-phase outputs→the transistor V2 to the DC supply 01, so that the voltage from the DC power supply 01 is shared by the transistor U1 in the upper arm and the transistor V2 in the lower arm.

In addition, if, for example, the transistor U2 is turned on for any reason at the time of the transistor U1 is turned on and short-circuit occurs between the arms, the short circuit current flows from the DC power supply 01→the transistor U1→the transistor U2 to the DC supply 01, and the voltage from the DC power supply 01 is also shared by the transistor U1 in the upper arm and the transistor U2 in the lower arm.

As described above, however, since the forward-bias base current+$I_{B2}$ for the transistors U2 to W2 in the lower arms is set at a smaller value than the forward-bias base current+$I_{B1}$ for the transistors U1 to W1 in the upper arms, the internal resistances of the transistors in the lower arms correspondingly become larger than those of the transistors in the upper arms when the short circuit occurs. Therefore, the transistors U2 to W2 in the lower arms surely receive a larger voltage (larger than the threshold) from the DC power supply 01 than the transistors U1 to W1 in the upper arms. This ensures that the short-circuit protection circuits 1 provided in the transistors U2 to W2 in the lower arms detect the short circuit to reduce the forward-bias base current in order to restrain the short-circuit current, thereby protecting the transistors in the upper and lower arms.

Figure 2:
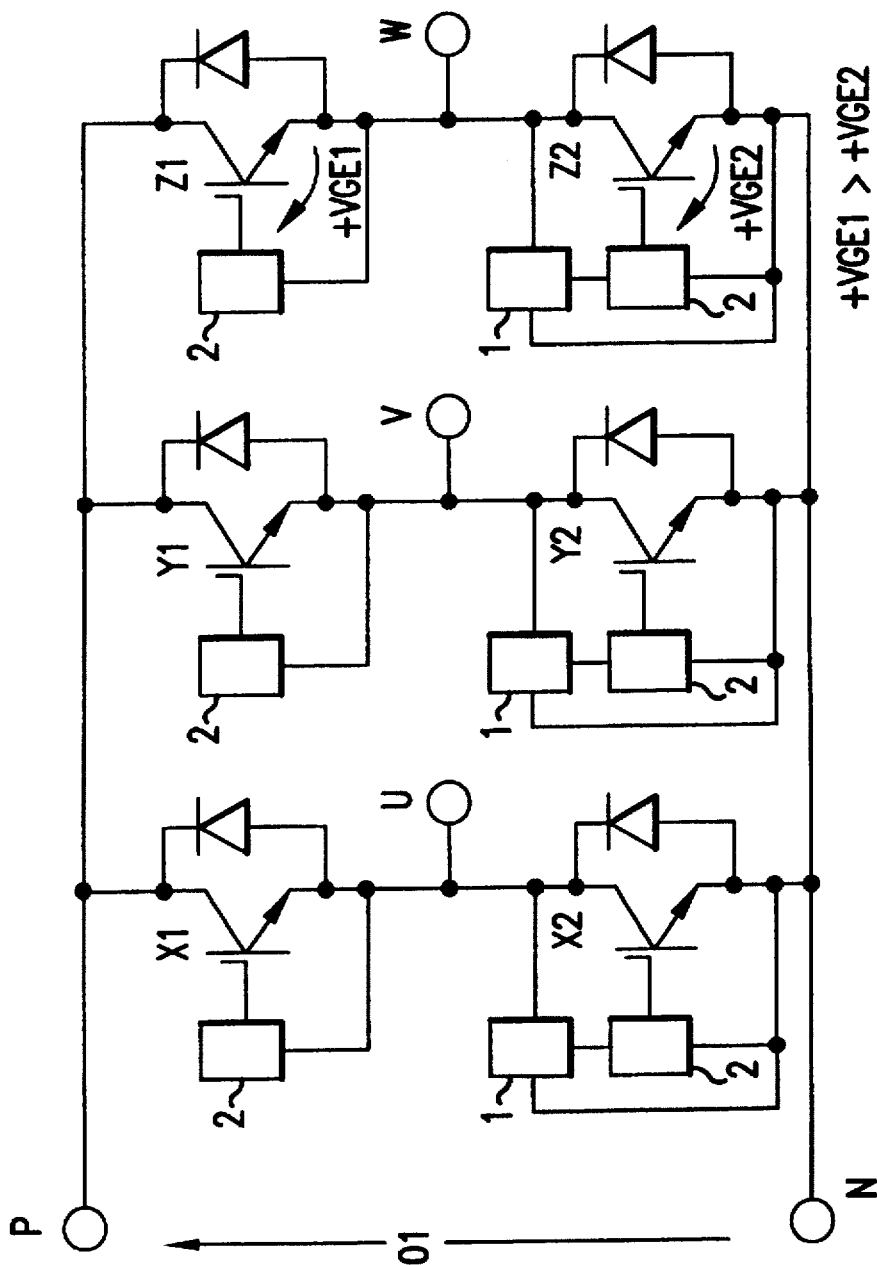
FIG. 2 is a circuit diagram showing a structure of a main part of a second embodiment of the invention.

FIG. 2 shows an example of a structure of a 3-phase bridge invertor circuit that uses IGBTs as voltage-driven self-arc-extinguishing semiconductor devices, to which the invention is applied. This figure also corresponds to FIG. 4.

Figure 4:
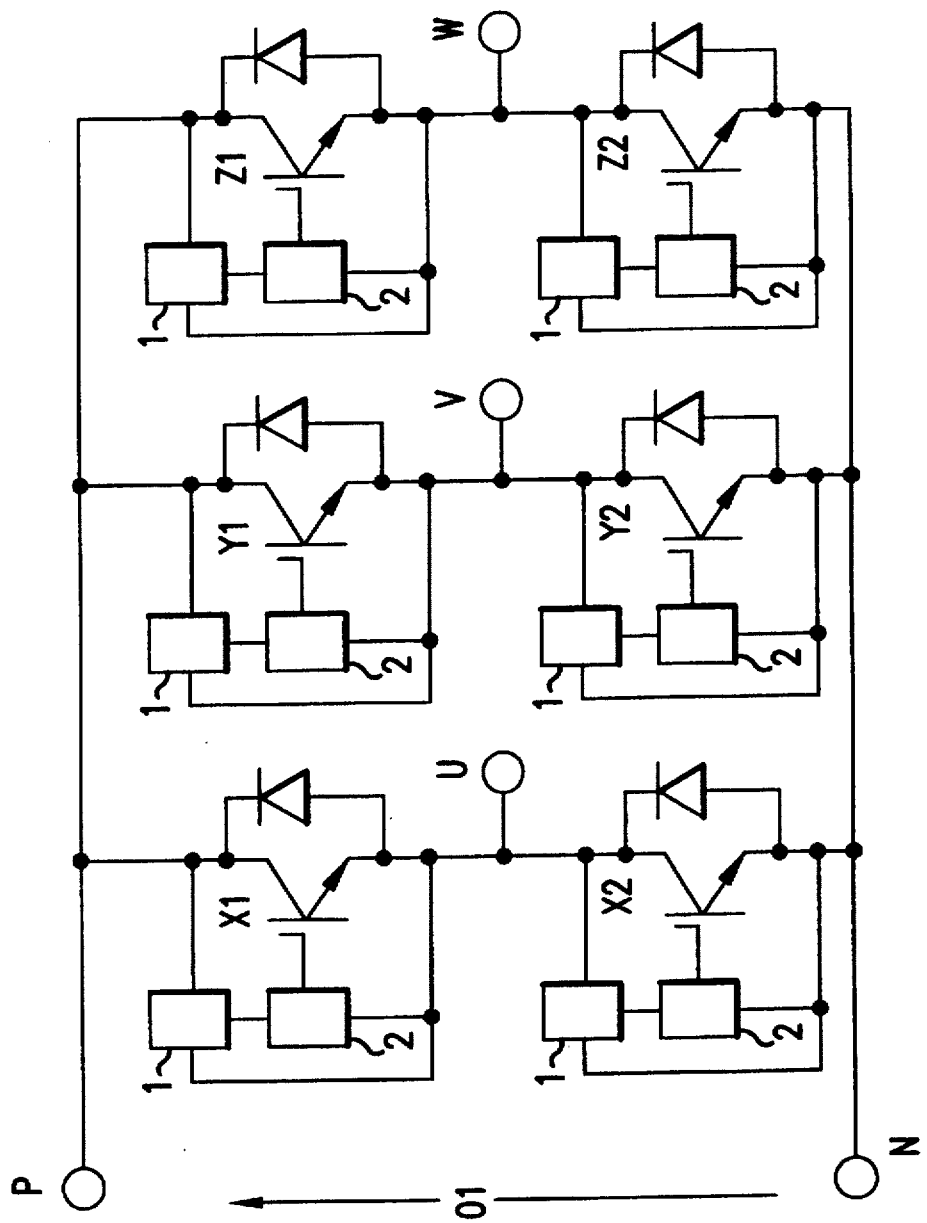
FIG. 4 is a circuit diagram showing a structure of a main part of a prior art.

In FIG. 2, the short-circuit protection circuits 1 for the IGBTs X1 to Z1 in the upper arms are omitted, unlike in FIG. 4. In the drive circuit 2 to drive the control terminal (in this case, the gate) of each of the IGBTs X1 to Z2, the forward-bias gate voltage +$V_{GE2}$ to drive the gate of each of the IGBTs X2 to Z2 in the lower arms is set at a smaller value than the forward-bias gate voltage +$V_{GE1}$ to drive the gate of each of the IGBTs X1 to Z1 in the upper arms. That is, these voltages are set as shown in the equation below.

$$+V_{GE1} > +V_{GE2} \qquad \text{Equation 2}$$

Thus, the internal resistance of each of the IGBTs in the lower arms correspondingly becomes larger than that of each of the IGBTs in the upper arms when short circuit occurs. Therefore, the IGBTs X2 to Z2 in the lower arms receive a larger amount of voltage from the DC power supply 01 than the IGBTs X1 to Z1 in the upper arms. This ensures that the short-circuit protection circuits 1 provided in the IGBTs X2 to Z2 in the lower arms detect the short circuit to reduce the forward-bias gate voltage and restrain the short-circuit current, thereby protecting the IGBTs in the upper and lower arms.

Figure 3:
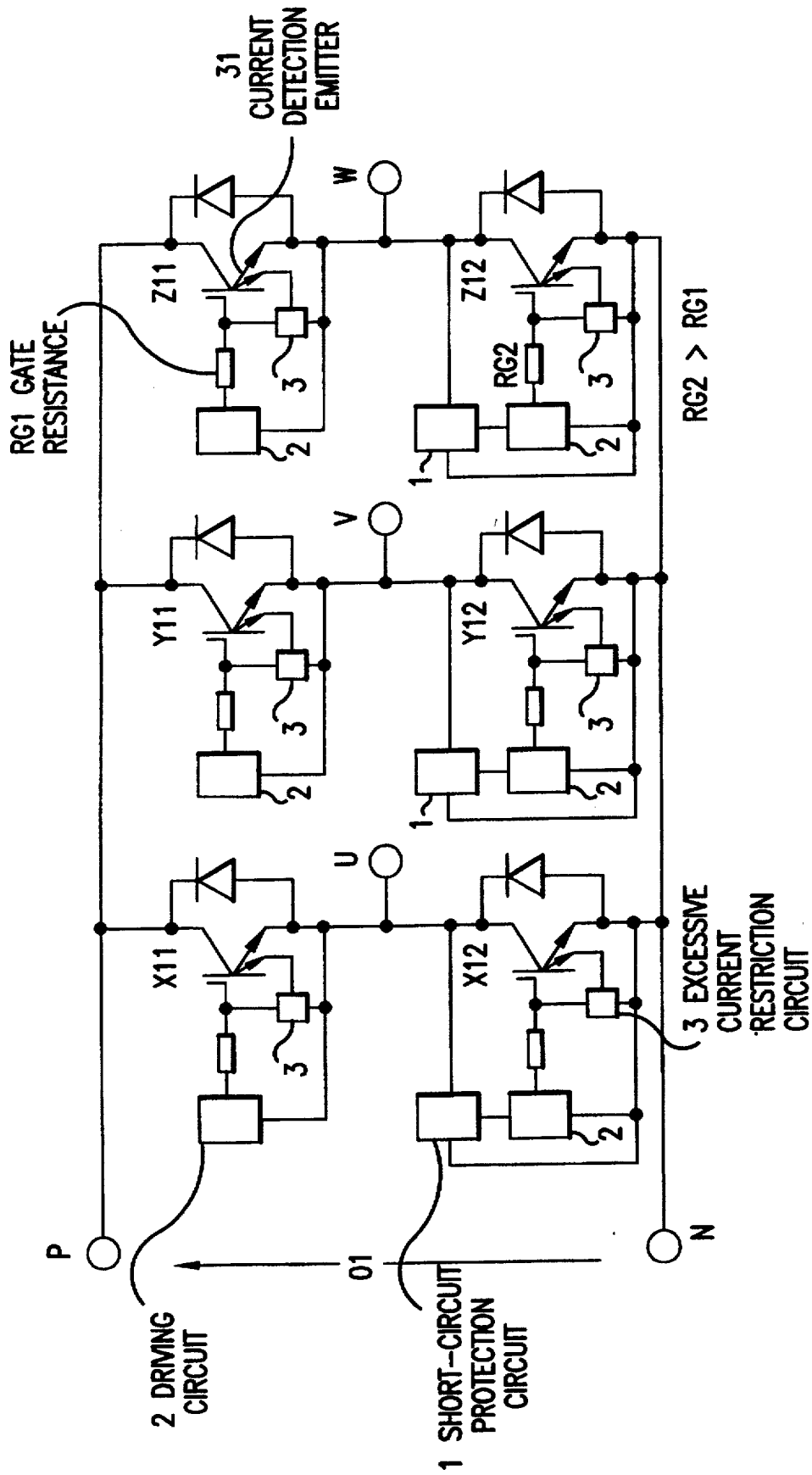
FIG. 3 is a circuit diagram showing a structure of a main part of a third embodiment of the invention.

FIG. 3 shows an example of a structure of a 3-phase bridge invertor circuit that uses IGBTs as voltage-driven self-arc-extinguishing semiconductor devices having an excessive-current restriction circuit using a current-detection emitter (referred to as "IGBTs with a current-detection emitter"), to which the invention is applied. This figure corresponds to FIG. 2.

In FIG. 3, 31 is a main-current detection emitter provided separately from an emitter to allow main current for IGBT to flow, and IGBTs with current-detection emitters X11 to Z11 and X12 to Z12 are used instead of the IGBTs X1 to Z1 and X2 to Z2 in FIG. 2.

Reference number 3 designates an excessive-current restriction circuit added to each of the IGBTs with current-detection emitters X11 to Z11 and X12 to Z12 and connected to the current-detection emitter 31, gate and emitter of each of the corresponding IGBTs. The excessive-current restriction circuit 3 is added to delay an increase in the short-circuit current flowing through the IGBT with the current-detection emitter in order to allow the protection circuit to operate easily when short circuit occurs.

In FIG. 3, a gate resistor $R_{G1}$ is inserted in series with the gate of each of the IGBTs with current-detection emitters in the upper arms X11 to Z11, while a gate resistor $R_{G2}$ is inserted in series with the gate of each of the IGBTs with current-detection emitters in the lower arms X12 to Z12. The gate resistance $R_{G1}$ of the upper arm is set at a smaller value than the gate resistance $R_{G2}$ of the lower arm, so as to fulfill the equation (3) shown below.

$$R_{G2} > R_{G1} \qquad \text{Equation 3}$$

The IGBT with a current-detection emitter including the excessive-current restriction circuit 3 has a characteristic such that its internal resistance increases as the gate resistance increases or forward-bias gate voltage decreases. Thus, when the gate resistances $R_{G1}$, $R_{G2}$ of the IGBTs in the upper and lower arms are set as shown in the equation (3), the IGBTs with current-detection emitters in the lower arms X12 to Z12 receive a larger amount of voltage from the DC power supply 01 than the IGBTs with current-detection emitters in the upper arms X11 to Z11. This ensures that the short-circuit protection circuits 1 provided in the IGBTs X12 to Z12 in the lower arms detect the short circuit to reduce the forward-bias gate voltage in order to restrain the short-circuit current, thereby protecting the IGBTs with current-detection emitters in the upper and lower arms.

According to the invention, a power converter includes series circuits of pairs of self-arc-extinguishing semiconductor devices in upper and lower arms, which are connected between the electrodes of a DC power supply, wherein the converter switches the pairs of the semiconductor devices to convert the power from the DC power supply and obtain the converted power from the connections of the pairs of the semiconductor devices.

The drive conditions are set to be different for the semiconductor devices in the upper and lower arms, so that a short-circuit protection circuit using a saturated-voltage monitoring method may be provided only in either the upper or lower arm, thereby simplifying the short-circuit protection circuit to enable the size of the controlling print boards to be reduced.

What is claimed is:

1. A method of protection of semiconductor devices for a power converter including pairs of semiconductor devices operating as switching elements, each pair having upper and lower arms and being connected in series between electrodes of a DC power supply, said converter switching the pairs of the semiconductor devices to convert power from said DC power supply to obtain converted power from a connection between the semiconductor devices in each pair, said method comprising:

setting magnitudes of drive signals or drive-circuit constants for the semiconductor devices of the upper and lower arms in each pair to be different from each other, and providing protection means in only one of the semiconductor devices in the pair of the upper and lower arms, said protection means monitoring voltage between main terminals of the semiconductor device where the protection means is installed and controlling a drive signal for said semiconductor device to prevent passage of an excessive current therethrough.

2. A method of protection of semiconductor devices according to claim 1, wherein said semiconductor devices are current-driven, and a forward-bias current for the semiconductor device in the arm with the protection means is set at a smaller value than a forward-bias current for the semiconductor device in the arm without the protection means.

3. A method of protection of semiconductor devices according to claim 1, wherein said semiconductor devices are voltage-driven, and a forward bias voltage for the semiconductor device in the arm with the protection means is set at a smaller value than a forward-bias voltage for the semiconductor device in the arm without the protection means.

4. A method of protection of semiconductor devices according to claim 1, wherein said semiconductor devices are voltage-driven and include excessive-current-restriction circuits using current detection emitters, a gate resistance for the semiconductor device in the arm with the protection means being set at a greater value than a gate resistance for the semiconductor device in the arm without the protection means.

5. A method of protection of semiconductor devices according to claim 1, wherein said protection means compares a threshold value with the voltage passing through the semiconductor device with the protection means and outputs a signal to detect a condition of short circuit and to reduce a short circuit current when said voltage exceeds the threshold value.

6. A method of protection of semiconductor devices according to claim 5, wherein said drive signal or said drive-circuit constant at the lower arm are set to be smaller than that of the upper arm, and the protection means is attached to the lower arm.

* * * * *

UNITED STATES PATENT AND TRADEMARK OFFICE
CERTIFICATE OF CORRECTION

PATENT NO. : 5,737,200
DATED : April 7, 1998
INVENTOR(S) : Shuji Miyashita; Ayumi Fujibayashi It is certified that error appears in the above-indentified patent and that said Letters Patent is hereby corrected as shown below:

In column 2, line 25, change "terminal" to --terminals--;

In column 3, line 30, change "+$I_{B1}$>$I_{B2}$" to --+$I_{B1}$>+$I_{B2}$--;

In column 3, lines 32 & 41, change "at the time of" to --at the time--; and

In column 4, line 14, change "DC." to --DC--.

Signed and Sealed this

Fourth Day of August, 1998

Attest:

BRUCE LEHMAN

*Attesting Officer*  *Commissioner of Patents and Trademarks*